United States Patent
Sugaya (10) Patent No.: US 10,419,671 B2
(45) Date of Patent: Sep. 17, 2019

(54) SYSTEM, METHOD, AND PROGRAM FOR DISPLAYING OMNIDIRECTIONAL CAMERA IMAGE

(71) Applicant: OPTiM Corporation, Saga-shi (JP)

(72) Inventor: Shunji Sugaya, Tokyo (JP)

(73) Assignee: OPTIM CORPORATION, Saga-shi (JP)

( * ) Notice: Subject to any disclaimer, the term of this patent is extended or adjusted under 35 U.S.C. 154(b) by 0 days.

(21) Appl. No.: 16/313,213

(22) PCT Filed: Jun. 30, 2016

(86) PCT No.: PCT/JP2016/069506
§ 371 (c)(1),
(2) Date: Dec. 26, 2018

(87) PCT Pub. No.: WO2018/003081
PCT Pub. Date: Jan. 4, 2018

(65) Prior Publication Data
US 2019/0166311 A1    May 30, 2019

(51) Int. Cl.
*H04N 21/2187* (2011.01)
*H04N 5/232* (2006.01)
(Continued)

(52) U.S. Cl.
CPC ......... *H04N 5/23238* (2013.01); *H04N 5/247* (2013.01); *H04N 7/181* (2013.01);
(Continued)

(58) Field of Classification Search
USPC ........................................... 348/36
See application file for complete search history.

(56) References Cited

U.S. PATENT DOCUMENTS

| 2014/0146132 A1* | 5/2014 | Bagnato | G02B 27/2228 348/36 |
| 2017/0054959 A1* | 2/2017 | Kawakami | G03B 21/14 |

(Continued)

FOREIGN PATENT DOCUMENTS

| JP | 2011-249865 | 12/2011 |
| JP | 2015-170866 | 9/2015 |

(Continued)

*Primary Examiner* — Behrooz M Senfi
(74) *Attorney, Agent, or Firm* — Lex IP Meister, PLLC (57) ABSTRACT

The present invention is to provide a system, a method, and a program for displaying an omnidirectional camera image that enable a plurality of people to see a 360-degree image taken by an omnidirectional camera in their individuals' visions. The system for displaying an omnidirectional camera image 1 includes an image acquisition module 14 that displays a 360-degree image taken by an omnidirectional camera 5 on a plurality of terminals 30 and acquires a 360-degree image taken by the omnidirectional camera 5; an image distribution module 25 that distributes the acquired image to a plurality of user terminals 30; an operation input receiving module 38 that receives an operation input from each user of the terminals 30; and an image display module 39 that displays an arbitrary part of the distributed 360-degree image on a user terminal owned by the each user based on the operation input received from the each user.

10 Claims, 8 Drawing Sheets

(51) Int. Cl.
*H04N 21/2343* (2011.01)
*H04N 5/247* (2006.01)
*H04N 7/18* (2006.01)
*H04N 21/218* (2011.01)

(52) U.S. Cl.
CPC ......... *H04N 7/183* (2013.01); *H04N 21/2187* (2013.01); *H04N 21/21805* (2013.01); *H04N 21/2343* (2013.01); *H04N 2201/3264* (2013.01)

(56) References Cited

U.S. PATENT DOCUMENTS

2017/0169540 A1  6/2017  Satori et al.
2018/0234665 A1*  8/2018  Shim ..................... H04N 7/181

FOREIGN PATENT DOCUMENTS

| JP | 2015-194069 | 11/2015 |
| JP | 2015-220595 | 12/2015 |
| JP | 2016-010021 | 1/2016 |

\* cited by examiner

SYSTEM, METHOD, AND PROGRAM FOR DISPLAYING OMNIDIRECTIONAL CAMERA IMAGE

BACKGROUND

(a) Field

The present invention relates to a system, a method, and a program for displaying an omnidirectional camera image, which displays a 360-degree image taken by an omnidirectional camera on a plurality of user terminals.

(b) Description of the Related Art

Recently, omnidirectional cameras that are capable to image a 360-degree range centering on the position of the lens have been widespread. Such omnidirectional cameras are used in various situations because of their capability of imaging a wide range.

For example, a device for inspecting a structure that includes an omnidirectional camera that serially takes images of the structure surface in a radio-controlled rotorcraft, which transmits the images taken by the omnidirectional camera to a management terminal, analyzes the images in the processing unit, and judges whether or not the structure has a flaw, has been proposed (refer to Patent Document 1). The device of Patent Document 1 is capable to image a structure surface more widely by using an omnidirectional camera.

CITATION LIST

Patent Literature

Patent Document 1: JP 2015-194069A

SUMMARY

The device of Patent Document 1 transmits the images taken by the omnidirectional camera to only a limited number of terminals. However, the user may want to transmit the images taken by the omnidirectional camera to a large number of terminals according to its utilization. For example, if the 360-degree images of a concert or a sporting event that is taken by the omnidirectional camera are distributed to a large number of terminals, people who not in the concert hall, the sports stadium, etc., can grasp the situations from various angles.

In view of the above-mentioned problems, an objective of the present invention is to provide a system, a method, and a program for displaying an omnidirectional camera image that enable a plurality of people to see a 360-degree image taken by an omnidirectional camera in their individuals' visions.

The first aspect of the present invention provides a system for displaying an omnidirectional camera image, the system displaying a 360-degree image taken by an omnidirectional camera on a plurality of user terminals, including:

an image acquisition unit that acquires a 360-degree image taken by the omnidirectional camera;

an image distribution unit that distributes the acquired image to a plurality of user terminals;

an operation input receiving unit that receives an operation input from each user of the plurality of user terminals; and an image display unit that displays an arbitrary part of the distributed 360-degree image on a user terminal owned by the each user based on the operation input received from the each user.

According to the first aspect of the present invention, an arbitrary part of an image taken by an omnidirectional camera can be displayed on a user terminal owned by the each user based on the operation input received from the each user of a plurality of user terminals. Therefore, the first aspect of the present invention can provide a system for displaying an omnidirectional camera image that enables a plurality of people to see a single 360-degree image taken by an omnidirectional camera in their individuals' visions.

The first aspect of the present invention is the category of a system, but the categories of a method and a program have similar functions and effects.

The second aspect of the present invention provides the system according to the first aspect of the present invention, in which the image display unit displays a part other than the arbitrary part of the displayed 360-degree image if the operation input receiving unit receives an operation input different from the received operation input.

According to the second aspect of the present invention, the displayed part of the 360-degree image can be moved by a different operation input. Therefore, the second aspect of the present invention can provide a system for displaying an omnidirectional camera image that enables a plurality of people to see a 360-degree image taken by an omnidirectional camera in their shifted individuals' visions.

The third aspect of the present invention provides the system according to the first aspect of the present invention, further including: a request receiving unit that receives a request from the each user; and a requested image-distribution unit that distributes a requested-image based on the received request to a user terminal operated by the each user, in which the image display unit displays the distributed requested-image on a user terminal operated by the each user.

According to the third aspect of the present invention, a requested-image based on a request from each user can be displayed on a user terminal operated by the each user. Therefore, the third aspect of the present invention can provide a system for displaying an omnidirectional camera image that enables a plurality of people to see a 360-degree image taken by an omnidirectional camera in their individuals' visions based on their requests.

The fourth aspect of the present invention provides the system according to the first aspect of the present invention, further including: a plurality of sound collecting units that collect a sound from surroundings of the omnidirectional camera; a sound output unit that outputs the collected sound; and a sound adjustment unit that adjusts a sound to be output from the sound output unit according to the direction of an arbitrary part of the displayed 360-degree image.

According to the fourth aspect of the present invention, a sound to be output can be adjusted according to the direction of an arbitrary part of the displayed 360-degree image based on an operation input from each user. Therefore, the fourth aspect of the present invention can provide a system for displaying an omnidirectional camera image that enables a plurality of people to see a 360-degree image taken by an omnidirectional camera in their individuals' visions and also to hear a sound for their individuals' visions.

The fifth aspect of the present invention provides the system according to the fourth aspect of the present invention, in which the sound adjustment unit synthesizes a sound from the sounds collected by the plurality of sound collecting units and adjusts the sound.

According to the fifth aspect of the present invention, a sound to be output can be synthesized from the collected sounds and adjusted according to the direction of an arbitrary part of the displayed 360-degree image based on an operation input from each user. Therefore, the fifth aspect of the present invention can provide a system for displaying an omnidirectional camera image that enables a plurality of people to see a 360-degree image taken by an omnidirectional camera in their individuals' visions and also to hear a sound for their individuals' visions even if no microphones to collect sounds are arranged around 360 degrees.

The sixth aspect of the present invention provides the system according to the first aspect of the present invention, further including: a cache creation unit that creates a cache for the acquired image, in which the image distribution unit distributes the created cache for the image to a plurality of user terminals.

According to the sixth aspect of the present invention, a cache is created for the image and then distributed to a plurality of user terminals. Therefore, the sixth aspect of the present invention can reduce the load on the system for displaying an omnidirectional camera image and stably distribute images to more user terminals compared with the case to directly distribute the acquired images to a plurality of user terminals.

The seventh aspect of the present invention provides the system according to the first aspect of the present invention, in which the image distribution unit sequentially distributes images to the plurality of user terminals.

According to the seventh aspect of the present invention, images are sequentially distributed to a plurality of user terminals. Therefore, the seventh aspect of the present invention can reduce the load on the system for displaying an omnidirectional camera image and stably distribute images to more user terminals compared with the case to distribute the acquired image to a plurality of user terminals at the same time.

The eighth aspect of the present invention provides the system according to the first aspect of the present invention, in which the image distribution unit evenly distributes images to the plurality of user terminals.

According to the eighth aspect of the present invention, images are evenly distributed to a plurality of user terminals. Therefore, the eighth aspect of the present invention can distribute images to the plurality of user terminals at approximately the same speed.

The present invention can provide a system, a method, and a program for displaying an omnidirectional camera image that enable a plurality of people to see a 360-degree image taken by an omnidirectional camera in their individuals' visions.

DETAILED DESCRIPTION OF THE EMBODIMENTS

Embodiments of the present invention will be described below with reference to the attached drawings. However, this is illustrative only, and the technological scope of the present invention is not limited thereto.

Overview of System for Displaying an Omnidirectional Camera Image

Figure 1:
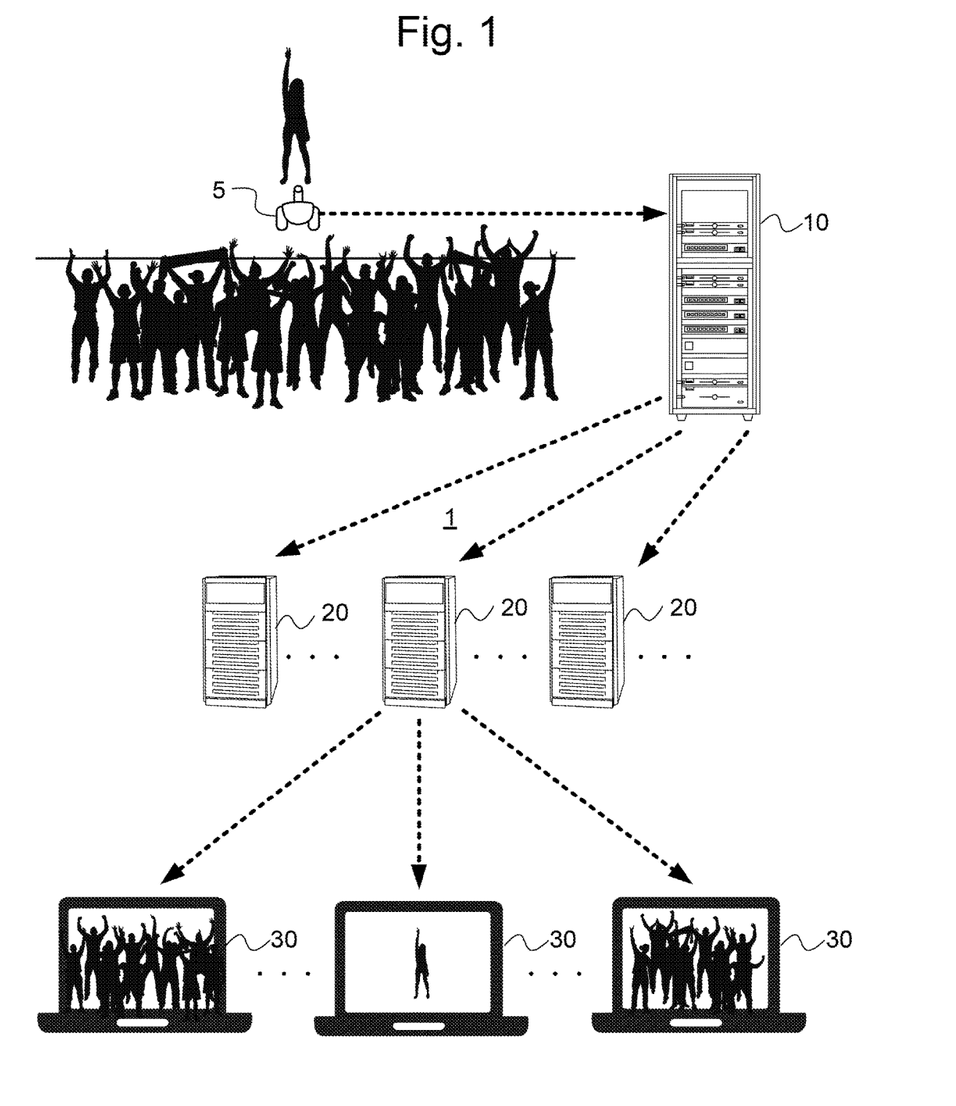
FIG. 1 shows an overall view of the system for displaying an omnidirectional camera image 1 according to a preferred embodiment of the present invention.

FIG. 1 shows an overall view of the system for displaying an omnidirectional camera image 1 according to a preferred embodiment of the present invention. The overview of the system for displaying an omnidirectional camera image 1 will be described below with reference to FIG. 1. The system for displaying an omnidirectional camera image 1 includes an image acquisition server 10, a caching server 20, and a terminal 30, which displays a 360-degree image taken by an omnidirectional camera 5 on a plurality of terminals 30.

In the system for displaying an omnidirectional camera image 1, the omnidirectional camera 5 is located at, for example, a place where it can image a specific object seen by a plurality of people from the front. Specifically, the omnidirectional camera 5 is located at a place where it can image the approximate center of a concert hall or a music player from the front or at a place where it can image the approximate center of a sports stadium or an athlete from the front.

The image acquisition server 10 acquires a 360-degree image taken by the omnidirectional camera 5 and transmits the acquired image to a plurality of caching servers 20. The caching servers 20 each create a cache for the received image and distribute the created cache to a plurality of terminals 30.

The plurality of terminals 30 receive a 360-degree image and also receive an operation input from the respective users who operate their respective terminals 30, and display an arbitrary part of the distributed 360-degree image based on the operation input received from the respective users.

If receiving an operation input different from the operation input received from the respective users, the plurality of terminals 30 display a part other than the arbitrary part of the displayed 360-degree image. In other words, the terminals 30 change the arbitrary part of the 360-degree image to be displayed according to the operation input mode from the respective users.

According to such a system for displaying an omnidirectional camera image 1, an arbitrary part of an image taken by an omnidirectional camera 5 can be displayed on a terminal 30 owned by each user based on the operation input received from the each user of a plurality of terminals 30. Therefore, the system for displaying an omnidirectional camera image enables a plurality of people to see a 360-degree image taken by an omnidirectional camera in their individuals' visions.

Moreover, according to the system for displaying an omnidirectional camera image 1, the part to be displayed of the 360-degree image can be moved by a different operation input from the user. Therefore, the system for displaying an omnidirectional camera image 1 enables a plurality of people to see a 360-degree image taken by an omnidirectional camera 5 in their shifted individuals' visions.

According to the system for displaying an omnidirectional camera image 1, the caching server 20 creates a cache for the image and then distributes the cache to a plurality of terminals 30. Therefore, the system for displaying an omnidirectional camera image 1 can reduce the load on itself and stably distribute images to more terminals 30 compared with the case where the image acquisition server 10 directly distributes the acquired image to a plurality of terminals 30.

Functions

Figure 2:
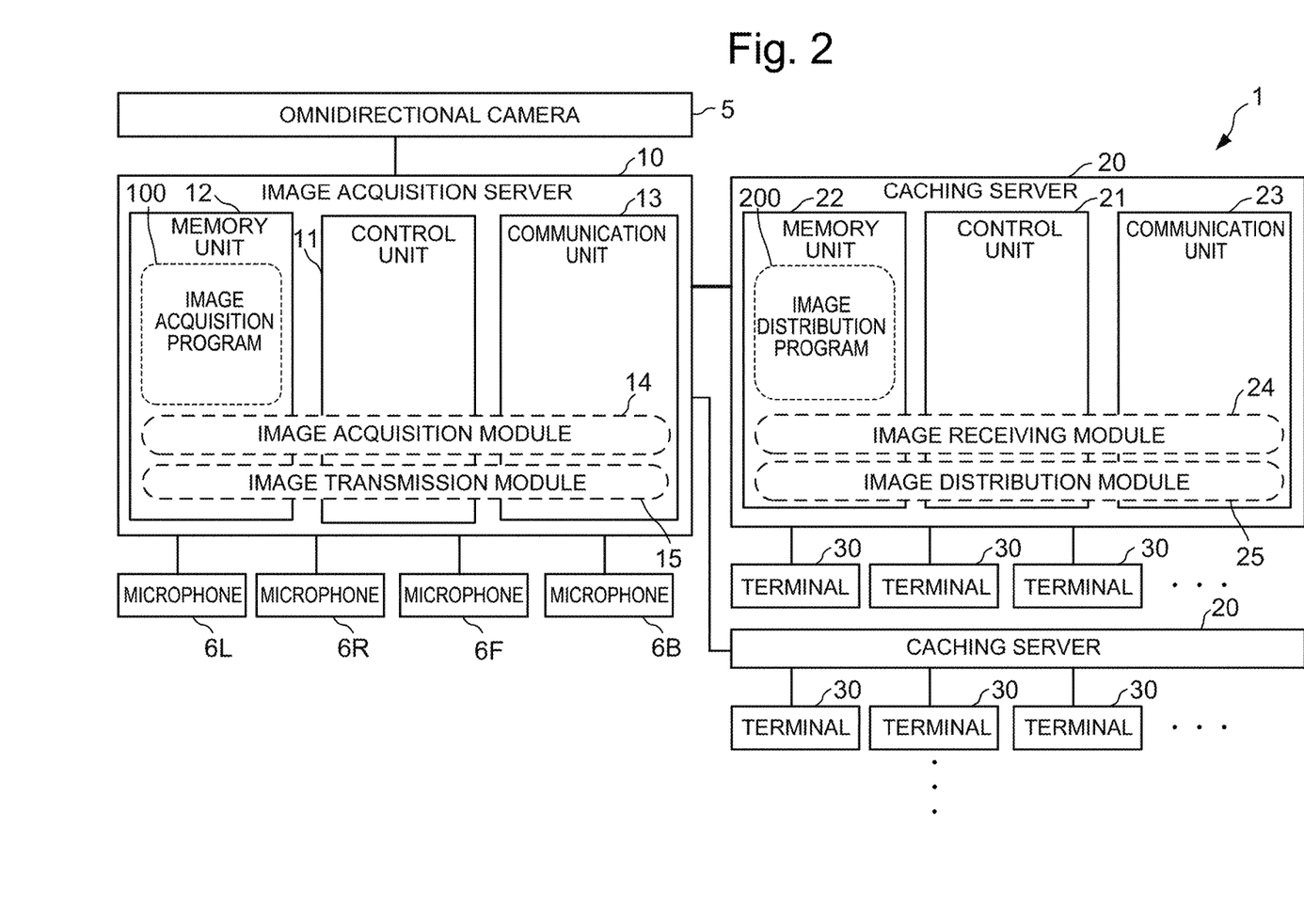
FIGS. 2 and 3 show a functional block diagram of the system for displaying an omnidirectional camera image 1 to illustrate the relationship among the functions.
Figure 3:
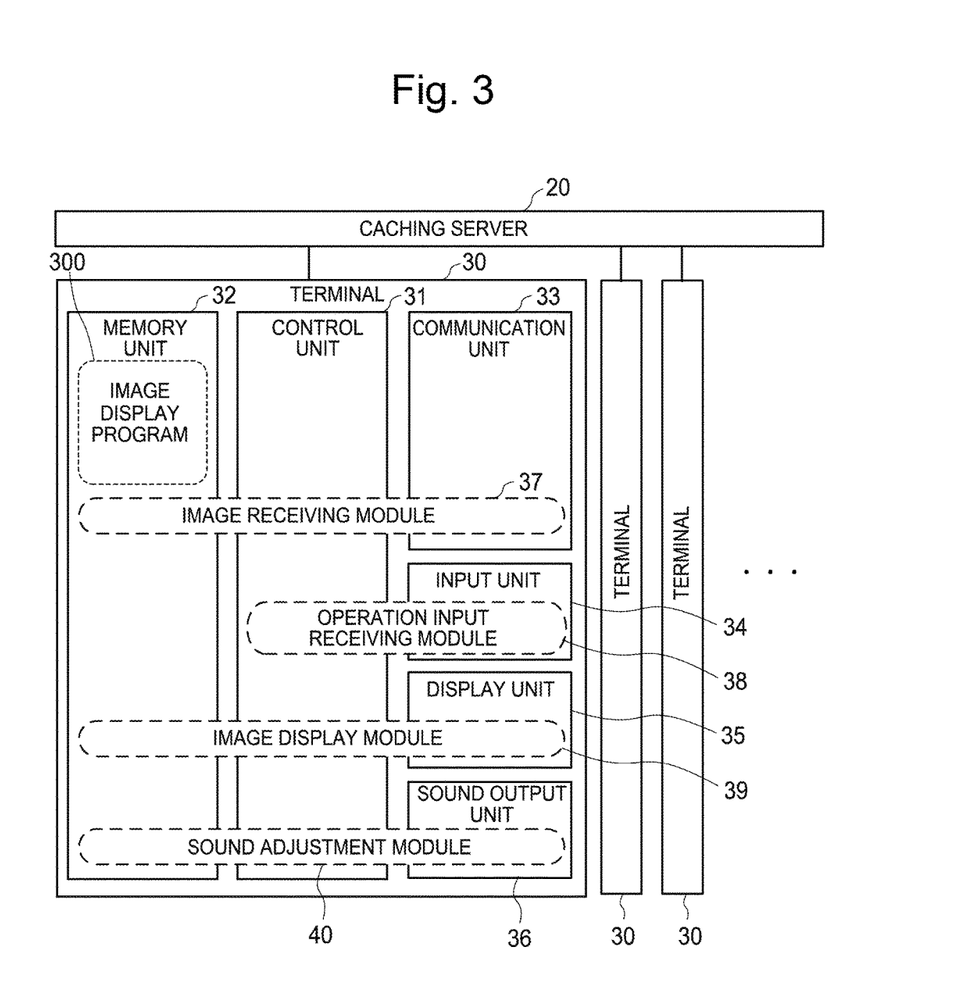

FIGS. 2 and 3 show a functional block diagram of the system for displaying an omnidirectional camera image 1 to illustrate the relationship among the functions. As shown in FIG. 2, in the system for displaying an omnidirectional camera image 1, the omnidirectional camera 5 and a plurality of microphones 6L, 6R, 6F, and 6B are connected with the image acquisition server 10 through a wired or unwired network. The image acquisition server 10 and the plurality of caching servers 20 are communicatively connected through a public line network. The caching server 20 and the plurality of terminals 30 are communicatively connected through a public line network.

The omnidirectional camera 5 includes a plurality of lenses and imaging devices. The plurality of lenses are arranged so that their respective optical axes are radially arranged. The omnidirectional camera 5 provides a 360-degree image in all directions to right and left and to up and down to a plurality of imaging devices and transmits image data formed by the imaging devices to the image acquisition server 10.

The microphones 6L, 6R, 6F, and 6B convert the collected sounds into electrical signals. For example, the microphone 6L is placed in the left side from the center of the omnidirectional camera 5 in the right-left direction, near the omnidirectional camera 5, facing forward. The microphone 6R is placed in the right side from the center of the omnidirectional camera 5 in the right-left direction, near the omnidirectional camera 5, facing forward. The microphone 6F is placed in the front side from the center of the omnidirectional camera 5 in the front-back direction, near the omnidirectional camera 5. The microphone 6B is placed in the back side from the center of the omnidirectional camera 5 in the front-back direction, near the omnidirectional camera 5. The microphones 6L, 6R, 6F, and 6B each transmit the collected sound data to the image acquisition server 10. Such microphones 6L, 6R, 6F, and 6B function as a plurality of sound collecting units that collect sounds from the surroundings of the omnidirectional camera.

The image acquisition server 10 is a general server provided with the functions to be described later, which includes a control unit 11 including a central processing unit (hereinafter referred to as "CPU"), a random access memory (hereinafter referred to as "RAM"), and a read only memory (hereinafter referred to as "ROM"); a memory unit 12 including a data storage unit such as a hard disk or a semiconductor memory; and a communication unit 13 including a Wireless Fidelity or Wi-Fi® enabled device complying with, for example, IEEE 802.11, or a wireless device complying with the IMT-2000 standard such as the third or the fourth generation mobile communication system. The memory unit 12 stores the image acquisition program 100; a plurality of image data acquired from the omnidirectional camera 5 and 360-degree image data synthesized from these image data; sound data acquired from the microphones 6L, 6R, 6F, and 6B; and data necessary for the control of the image acquisition server 10.

The number of the omnidirectional cameras 5 is one in this embodiment. However, the number is not limited to one and may be two or more. Thus, a plurality of omnidirectional cameras 5 may be arranged to surround a certain object. In this case, each of 360-degree image data based on the image data taken by a plurality of the omnidirectional cameras 5 may be selected on the image acquisition server 10 and the terminal 30.

In the image acquisition server 10, the control unit 11 reads the image acquisition program 100 to achieve an image acquisition module 14 and an image transmission module 15 in cooperation with the memory unit 12 and the communication unit 13.

The caching server 20 is a general server provided with the functions to be described later, which includes a control unit 21 including a CPU, a RAM, and a ROM; a memory unit 22 including a data storage unit such as a hard disk or a semiconductor memory; and a communication unit 23 including a Wi-Fi® enabled device complying with, for example, IEEE 802.11, or a wireless device complying with the IMT-2000 standard such as the third or the fourth generation mobile communication system, in the same way as the image acquisition server 10. The memory unit 22 stores the image distribution program 200; the 360-degree image data and output sound data; that are received from the image acquisition server 10; and data necessary for the control of the caching server 20.

In the caching server 20, the control unit 21 reads the image distribution program 200 to achieve an image receiving module 24 and an image distribution module 25 in cooperation with the memory unit 22 and the communication unit 23.

The terminal 30 may be a general information terminal provided with a communication unit, which is an information device provided with the functions to be described later. For example, the terminal 30 may be a portable terminal such as a mobile phone, a smart phone, a net book terminal, a slate terminal, an electronic book terminal, an electronic dictionary terminal, a portable music player, or a portable content recording and reproducing device, or may be a stationary terminal such as a personal computer.

As shown in FIG. 3, the terminal 30 includes a control unit 31 including a CPU, a RAM, and a ROM; a memory unit 32 including a data storage unit; a communication unit 33 including a Wi-Fi® enabled device complying with, for example, IEEE 802.11 (or may be a wired device), an input unit 34 including an input means such as a touch panel, a keyboard, or a mouse; a display unit 35 including a display means such as a touch panel or a display; and a sound output unit 36 as a sound output means that outputs the collected sound, such as a speaker, in the same way as the image acquisition server 10. The memory unit 32 stores the image display program 300; the 360-degree image data and output sound data that are distributed from the caching server 20; and data necessary for the control of the terminal 30.

In the terminal 30, the control unit 31 reads the image display program 300 to achieve an image receiving module 37 in cooperation with the memory unit 32 and the communication unit 33, to achieve an operation input receiving module 38 in cooperation with the input unit 34, to achieve an image display module 39 in cooperation with the display unit 35, and to achieve a sound adjustment module 40 in cooperation with the sound output unit 36.

Image Display Process

Figure 4:
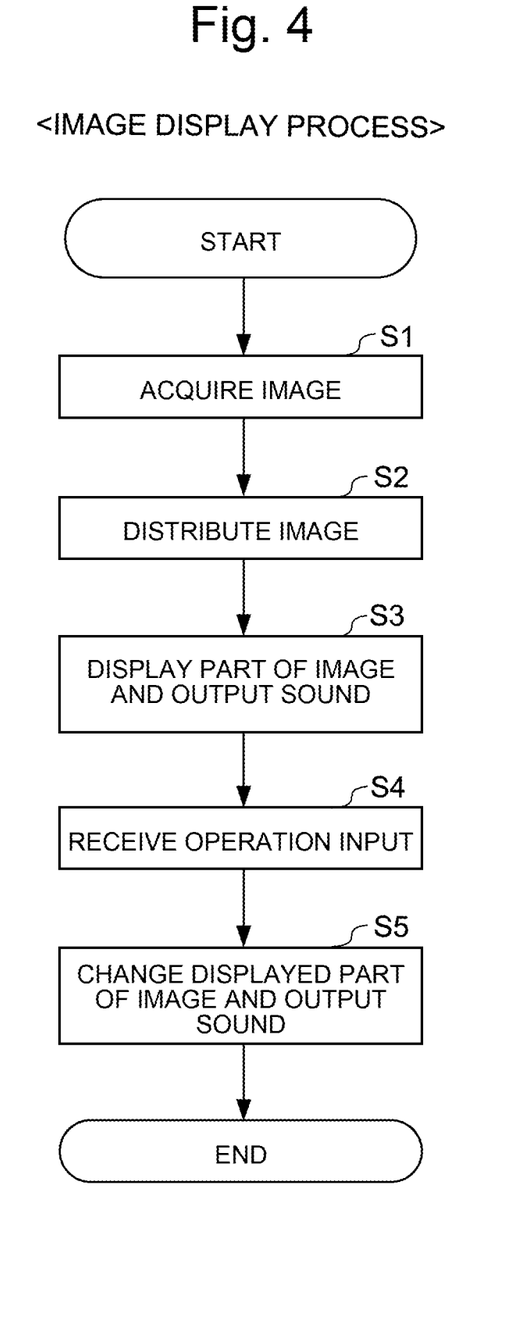
FIG. 4 shows a flow chart of the image display process performed by the system for displaying an omnidirectional camera image 1.

FIG. 4 shows a flow chart of the image display process performed by the system for displaying an omnidirectional camera image 1. The tasks executed by the modules will be described below with this process. First, the image acquisition server 10 controls the omnidirectional camera 5 and receives the image data taken through a plurality of lens, and the sound data collected from the microphones 6L, 6R, 6F, and 6B.

In the step S1, the image acquisition module 14 of the image acquisition server 10 acquires the 360-degree image taken by the omnidirectional camera 5. Specifically, the image acquisition module 14 synthesizes 360-degree image data from the image data received from the omnidirectional camera 5, which are taken through a plurality of lens and associates and stores the 360-degree image data with the received sound data in the memory unit 12.

In the step S2, the image transmission module 15 of the image acquisition server 10 transmits the 360-degree image data and the sound data that are stored in the memory unit 12 to a plurality of caching servers 20. The image receiving module 24 of each of the caching servers 20 receives the 360-degree image data and the sound data from the image acquisition server 10. The image distribution module 25 of each of the caching servers 20 evenly or sequentially distributes the 360-degree image data and the sound data that the image receiving module 24 receives, to a plurality of terminals 30. The image receiving module 37 of each of the terminals 30 receives the 360-degree image data and the sound data from the caching server 20.

In the step S3, the image display module 39 of each of the terminals 30 displays one arbitrary part of the distributed 360-degree image. Specifically, the image display module 39 displays the image of one arbitrary part of 360 degrees (e.g., an image that centers on a preset front face) based on the 360-degree image data received by the image receiving module 37 in the step 2, on the display unit 35. Furthermore, in this step, the sound adjustment module 40 of each of the terminals 30 outputs one arbitrary part of the sound data collected from a plurality of microphones 6L, 6R, 6F, and 6B (e.g., sound data from the microphones 6L, 6R, 6F, and 6B associated with the image that centers on a preset front face) based on the sound data received by the image receiving module 37 in the step 2, from the sound output unit 36.

In the step S4, the operation input receiving module 38 of each of a plurality of terminals 30 receives an operation input from the input unit 34 (e.g., dragging operation from the input unit 34 for the image displayed on the display unit 35) from the user.

In the step S5, the image display module 39 of each of the terminals 30 displays a part other than the one arbitrary part in the 360-degree image displayed on the display unit 35 in response to the operation input from the input unit 34 that the operation input receiving module 38 received in the step S4. For example, if the operation input from the input unit 34 is a dragging operation to drag the image displayed on the display unit 35 in a predetermined direction, the image display module 39 moves the range displayed on the display unit 35 in the step S3 of the 360-degree image data in a predetermined direction.

Furthermore, in this step, the sound adjustment module 40 of each of the terminals 30 outputs a part other than the one arbitrary part of the sound data output from the sound output unit 36 in response to the operation input from the input unit 34 that the operation input receiving module 38 received in the step S4.

Figure 5:
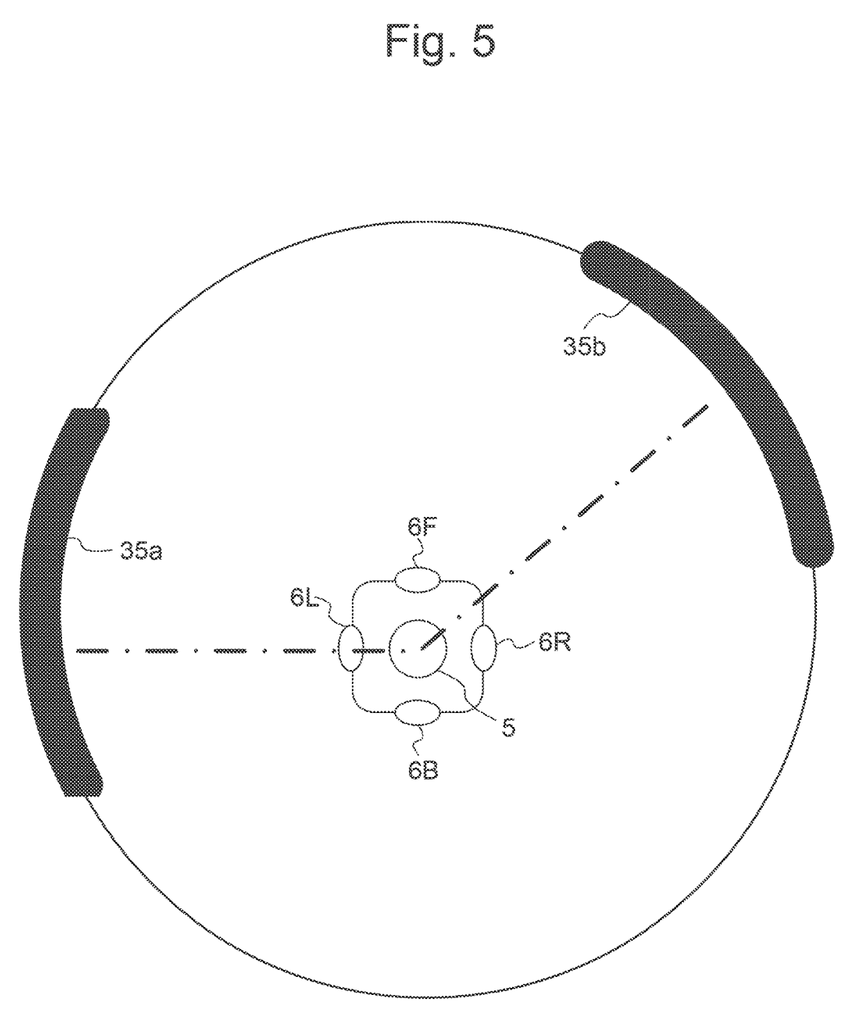
FIG. 5 shows a diagram illustrating one example of how to adjust a sound by the sound adjustment module 40 of the terminal 30.

FIG. 5 shows a diagram illustrating one example of how to adjust a sound by the sound adjustment module 40 of the terminal 30. If the center of the range 35a displayed on the display unit 35 in the step S3 of the 360-degree image data is the position at 90 degrees turned to the left from a preset front face of the omnidirectional camera, the sound adjustment module 40 synthesizes data from the sound data collected from the microphones 6F and 6B and outputs the synthesized data from the sound output unit 36.

The case in which the center of the range 35a displayed on the display unit 35 in the step S3 of the 360-degree image data is moved from the position at 90 degrees turned to the left from a preset front face of the omnidirectional camera 5 to the position (range 35b) at 60 degrees turned to the right from the front through the direction of the front in response to an operation input from the input unit 34 of a user will be described below. In this case, the sound adjustment module 40 gradually shifts the sound data to be output from the sound output unit 36 from the sound data collected from the microphones 6F and 6B to those from the microphones 6L and 6R, turns down the volume of the sound data collected from the microphone 6L, turns up the volume of the sound data collected from the microphone 6R, synthesizes data from the these sound data, and outputs the synthesized data from the sound output unit 36. For example, if the range 35b is displayed on the display unit 35, the sound adjustment module 40 synthesizes data to have a volume at a ratio of 1:3 of the volume of the sound data collected from the microphone 6L to that from the microphone 6R and outputs the synthesized data from the sound output unit 36.

Four microphones are arranged at intervals of 90 degrees along the circle, at the center of which the omnidirectional camera 5 is located, in this embodiment. However, the arrangement of microphones is not limited to this example. For example, more microphones may be arranged at shorter intervals to switch microphones collecting the sound data to be output from the sound output unit 36 in response to an operation input from the input unit 34 of the user.

Application Example

Figure 6:
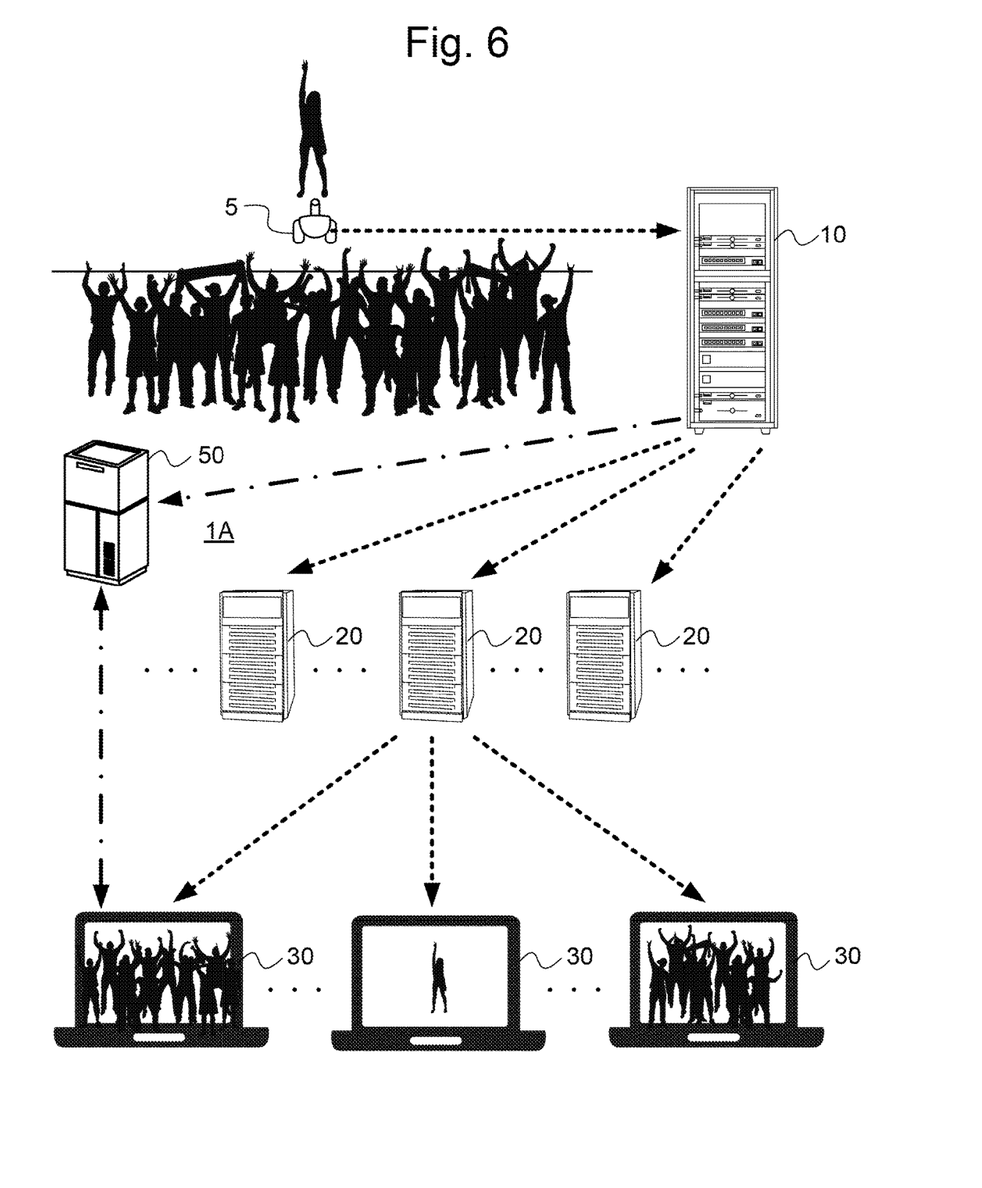
FIG. 6 shows an overall view of the system for displaying an omnidirectional camera image 1A according to a preferred embodiment of the present invention.

The system for displaying an omnidirectional camera image 1A according to an application example of this embodiment will be described below. FIG. 6 shows an overall view of the system for displaying an omnidirectional camera image 1A according to a preferred embodiment of the present invention.

The system for displaying an omnidirectional camera image 1A is different from the system for displaying an omnidirectional camera image 1 in that the system for displaying an omnidirectional camera image 1A further includes an image generation server 50 (refer to FIG. 1, etc.). The system for displaying an omnidirectional camera image 1A generates an image as requested by a user and distributes the generated image to the terminal 30 in addition to the functions of the system for displaying an omnidirectional camera image 1.

Overview of System for Displaying an Omnidirectional Camera Image According to Application Example The system for displaying an omnidirectional camera image 1A generates an image-generation data on only an object or a scene in the image generation server 50 based on the 360-degree image data. For example, if the system for displaying an omnidirectional camera image 1A is used in a sport competition, the image generation server 50 generates image-generation data only on 100-meter sprint, image-generation data that followed a certain athlete, image-generation data on the entire stadium, and image-generation data on the auditorium based on the 360-degree image data received from the image acquisition server 10.

Then, the user requests image-generation data that the user wants to see among such image-generation data generated by the image generation server 50, from the terminal 30. The image generation server 50 distributes the image-generation data based on the request from the terminal 30, to the terminal 30.

Functions of Image Generation Server 50

Figure 7:
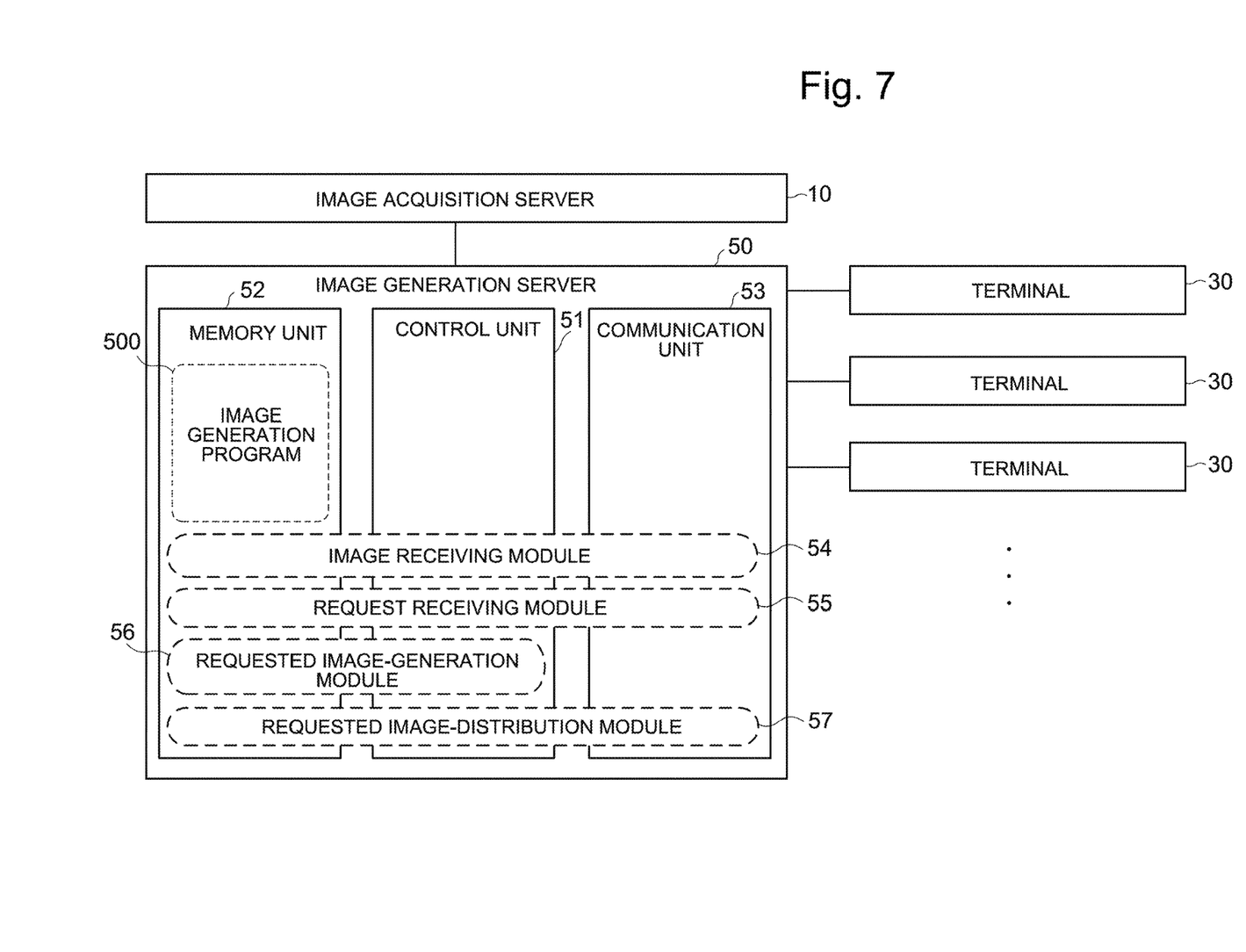
FIG. 7 shows a functional block diagram of the image generation server 50 of the system for displaying an omnidirectional camera image 1A to illustrate the relationship among the functions.

FIG. 7 shows a functional block diagram of the image generation server 50 of the system for displaying an omnidirectional camera image 1A to illustrate the relationship among the functions. The image generation server 50 is a general server provided with the functions to be described later, which includes a control unit 51 including a CPU, a RAM, and a ROM; a memory unit 52 including a data storage unit such as a hard disk or a semiconductor memory; and a communication unit 53 including a Wi-Fi® enabled device complying with, for example, IEEE 802.11, or a wireless device complying with the IMT-2000 standard such as the third or the fourth generation mobile communication system, in the same way as the image acquisition server 10 (refer to FIG. 2). The memory unit 52 stores the image generation program 500; the 360-degree image data and output sound data that are received from the image acquisition server 10; image-generation data and output sound-generation data that are generated based on the 360-degree image data and the output sound data; and data necessary for the control of the image generation server 50.

In the image generation server 50, the control unit 51 reads the image generation program 500 to achieve an image receiving module 54, a request receiving module 55, and a requested image-distribution module 57 in cooperation with the memory unit 52 and the communication unit 53 and to achieve a requested image-generation module 56 in cooperation with the memory unit 52.

Requested Image-Generation Process

Figure 8:
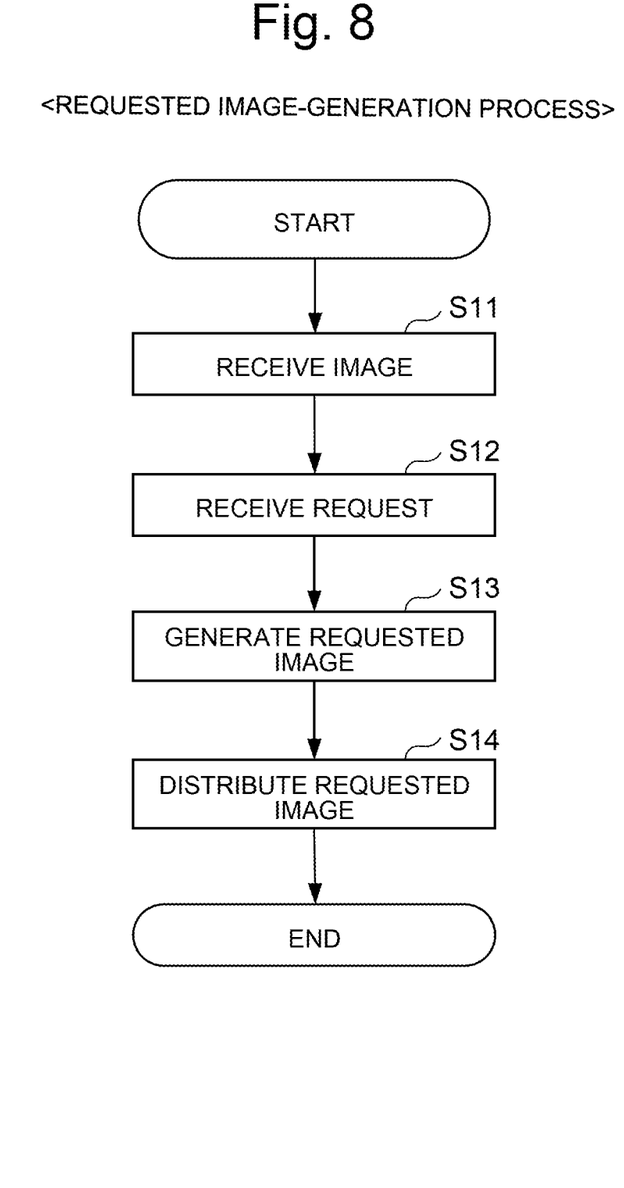
FIG. 8 shows a flow chart of the requested image-generation process performed by the image generation server 50 of the system for displaying an omnidirectional camera image 1A.

FIG. 8 shows a flow chart of the requested image-generation process performed by the image generation server 50 of the system for displaying an omnidirectional camera image 1A. The tasks executed by the modules will be described below with this process.

In the step S11, the image receiving module 54 receives the 360-degree image data and the sound data from the image acquisition server 10 and stores the received data in the memory unit 52.

In the step S12, the request receiving module 55 receives request information indicating a request for an object (e.g., a certain game, figure, or scene) that the user wants to see from each of a plurality of terminals 30.

In the step S13, the requested image-generation module 56 is cut out the image-generation data on requested image based on the request information that have been received in the step S12 from the 360-degree image data and the sound data that have been received in the step S11.

In the step S14, the requested image-distribution module 57 distributes the image-generation data generated in the step S13 to the terminal 30 that transmitted the request information.

The terminal 30 receives the image-generation data with the image receiving module 37 (refer to FIG. 3), displays the received image-generation data on the display unit 35 (refer to FIG. 3) with the image display module 39 (refer to FIG. 3), and outputs the sound data contained in the image-generation data from the sound output unit 36 (refer to FIG. 3) with the sound adjustment module 40 (refer to FIG. 3).

To achieve the means and the functions that are described above, a computer (including a CPU, an information processor, and various terminals) reads and executes a predetermined program. For example, the program is provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

DESCRIPTION OF REFERENCE NUMBERS

1 System for displaying an omnidirectional camera image
5 Omnidirectional camera
14 Image acquisition module
25 Image distribution module
38 Operation input receiving module
39 Image display module

What is claimed is:

1. A system for displaying an omnidirectional camera image, the system displaying a 360-degree image taken by an omnidirectional camera on a plurality of user terminals, comprising:

an image acquisition unit that acquires a 360-degree image taken by the omnidirectional camera;

an image distribution unit that distributes the acquired image to a plurality of user terminals;

an operation input receiving unit that receives an operation input from each user of the plurality of user terminals;

an image display unit that displays an arbitrary part of the distributed 360-degree image on a user terminal owned by the each user based on the operation input received from the each user;

a plurality of sound collecting units that collect sounds from the surroundings of the omnidirectional camera; and a sound output unit that outputs a sound synthesized in stages to the movement as the collected sounds if the center of the displayed one arbitrary part moves to another position.

2. The system according to claim 1, wherein the image display unit displays a part other than the arbitrary part of the displayed 360-degree image if the operation input receiving unit receives an operation input different from the received operation input.

3. The system according to claim 1, further comprising: a request receiving unit that receives a request from the each user; and a requested image-distribution unit that distributes a requested-image based on the received request to a user terminal operated by the each user, wherein the image display unit displays the distributed requested-image on a user terminal operated by the each user.

4. The system according to claim 1, further comprising a sound adjustment unit that adjusts a sound to be output from the sound output unit according to the direction of an arbitrary part of the displayed 360-degree image.

5. The system according to claim 4, wherein the sound adjustment unit synthesizes a sound from the sounds collected by the plurality of sound collecting units and adjusts the sound.

6. The system according to claim 1, further comprising: a cache creation unit that creates a cache for the acquired image, wherein the image distribution unit distributes the created cache for the image to a plurality of user terminals.

7. The system according to claim 1, wherein the image distribution unit sequentially distributes images to the plurality of user terminals.

8. The system according to claim 1, wherein the image distribution unit evenly distributes images to the plurality of user terminals.

9. A method executed by a system for displaying an omnidirectional camera image, the system displaying a 360-degree image taken by an omnidirectional camera on a plurality of user terminals, comprising the steps of:

acquiring a 360-degree image taken by the omnidirectional camera;

distributing the acquired image to a plurality of user terminals;

receiving an operation input from each user of the plurality of user terminals;

displaying an arbitrary part of the distributed 360-degree image on a user terminal owned by the each user based on the operation input received from the each user;

collecting sounds from the surroundings of the omnidirectional camera; and outputting a sound synthesized in stages to the movement as the collected sounds if the center of the displayed one arbitrary part moves to another position.

10. A computer-readable program for causing a system for displaying an omnidirectional camera image, the system displaying a 360-degree image taken by an omnidirectional camera on a plurality of user terminals, to execute the steps of:

acquiring a 360-degree image taken by the omnidirectional camera;

distributing the acquired image to a plurality of user terminals;

receiving an operation input from each user of the plurality of user terminals;

displaying an arbitrary part of the distributed 360-degree image on a user terminal owned by the each user based on the operation input received from the each user;

collecting sounds from the surroundings of the omnidirectional camera; and outputting a sound synthesized in stages to the movement as the collected sounds if the center of the displayed one arbitrary part moves to another position.

* * * * *